US00H002202H

(19) United States

(12) Statutory Invention Registration

Conover et al.

(10) Reg. No.: US H2202 H

(43) Published: Sep. 4, 2007

(54) METHOD AND APPARATUS TO DYNAMICALLY HOOK RUNTIME PROCESSES WITHOUT INTERRUPTING THE FLOW OF EXECUTION

(75) Inventors: Matthew Conover, Mountain View, CA (US); Sourabh Satish, Mountain View, CA (US)

(73) Assignee: Symantec Corporation, Cupertino, CA (US)

(21) Appl. No.: 10/835,712

(22) Filed: Apr. 28, 2004

(51) Int. Cl.
*G06F 9/46* (2006.01)

(52) U.S. Cl. ..... 718/108

(58) Field of Classification Search ..... None
See application file for complete search history.

(56) References Cited

U.S. PATENT DOCUMENTS

2005/0166001 A1 * 7/2005 Conover et al. ..... 711/100

* cited by examiner

*Primary Examiner*—Dan Pihulic

(74) *Attorney, Agent, or Firm*—Gunnison, McKay & Hodgson, L.L.P.; Serge J. Hodgson

(57) ABSTRACT

A method of dynamically hooking runtime processes without interrupting the flow of execution includes: suspending a thread; hooking a function comprising modifying code of the function; and determining whether the thread was executing the modified code when the thread was suspended. If the thread was not executing the modified code, the thread is resumed. If the thread was executing the modified code, the context of the thread is changed to redirect the thread to a saved copy of the original prologue. In this manner, unpredictable behavior of the thread is avoided.

18 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS TO DYNAMICALLY HOOK RUNTIME PROCESSES WITHOUT INTERRUPTING THE FLOW OF EXECUTION

BACKGROUND OF THE INVENTION

1. Field of the Invention

The present invention relates to the protection of computer systems. More particularly, the present invention relates to hooking of runtime processes.

2. Description of the Related Art

The necessity of hooking runtime processes arises in various scenarios and situations like debugging, troubleshotting, profiling, extending functionality, etc. The challenge is to be able to successfully hook the function without interrupting the flow of execution.

When hooking a function via a prologue overwrite, the case that another thread was executing the prologue of the function that was hooked at the time it was hooked should be considered. With modern processors, the cache will become invalidated once the prologue is overwritten so that the CPU will execute the modified instructions. However, if it had executed only part of the prologue, this may create an invalid state that will crash the thread or the process.

SUMMARY OF THE INVENTION

A method of dynamically hooking runtime processes without interrupting the flow of execution includes: suspending a thread; hooking a function comprising modifying code of the function; and determining whether the thread was executing the modified code when the thread was suspended. If the thread was not executing the modified code, the thread is resumed. If the thread was executing the modified code, the context of the thread is changed to redirect the thread to a saved copy of the original prologue. In this manner, unpredictable behavior of the thread is avoided.

Embodiments in accordance with the present invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

Figure 1:
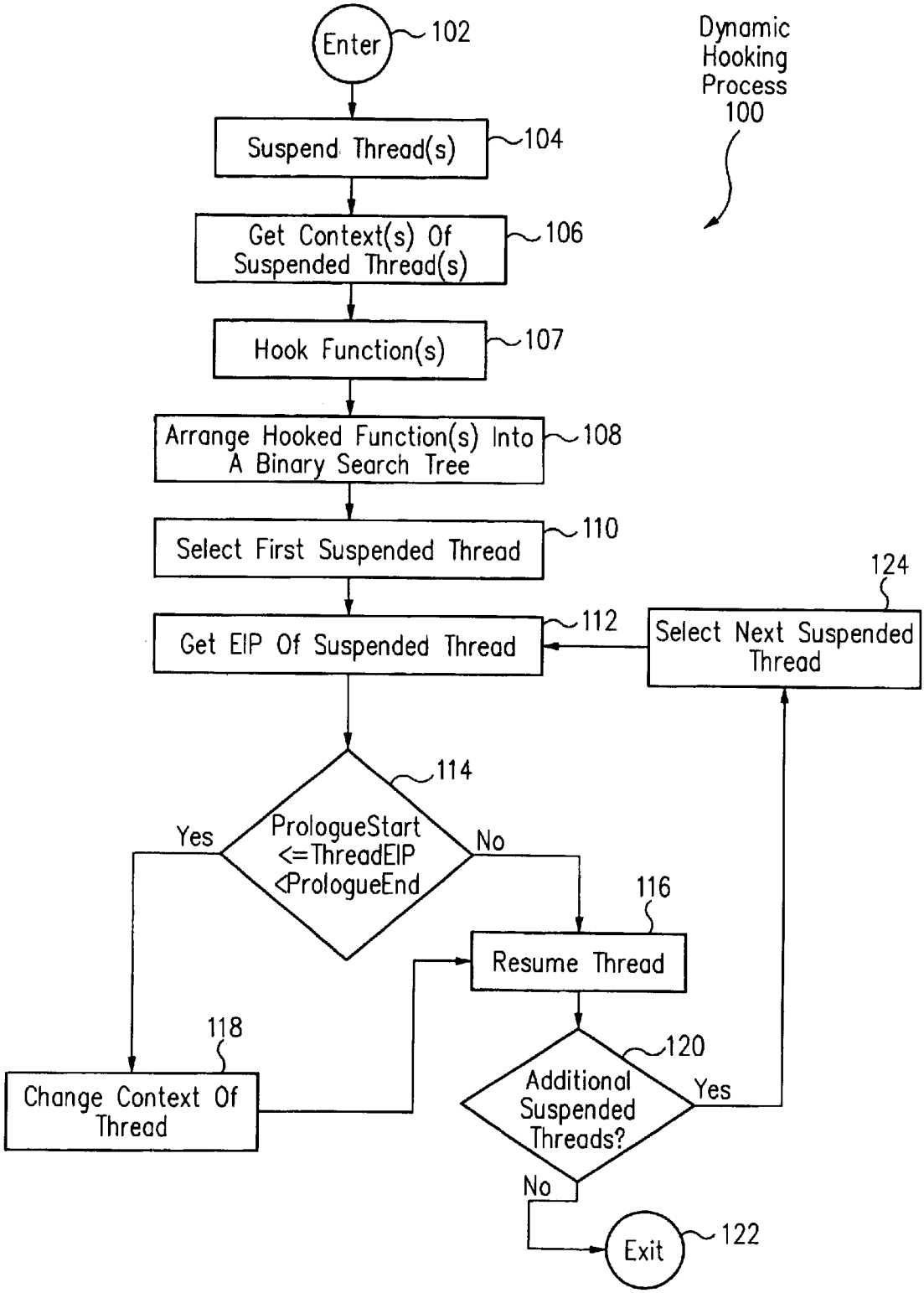
FIG. 1 is a flow diagram of a dynamic hooking process in accordance with one embodiment of the present invention.

In the whole process of suspending the threads, altering the code structure and resuming the threads during hooking of function(s), there lies a possibility that the thread that was suspended was executing one of the functions that was hooked. If part of what the thread was executing was modified while it was suspended, the behavior of the thread after being resumed is unpredictable.

Because hooking functions should not disrupt the process, one embodiment of the present invention adds an operation to function hooking through prologue overwrites whereby other threads in the process are checked to ensure they are not affected. A copy of the prologue that is being hooked is saved. If other threads in the process are being affected, the offset of the thread's instruction pointer into the prologue is calculated and the thread is redirected to the copy of the saved prologue, which then jumps back to the original function.

More particularly, a typical target function (to be hooked) looks like the following: [Prologue] [Function body] [Epilogue]

Hooking a function typically involves overwriting the usual prologue with a jump or call instruction to the hooking code. When hooing a live process, there will likely be several threads already running.

The hooking process typically must suspend any and all threads of the target process. The hooking process further injects the code pages or hooking thread, save copies of the original prologues, overwrite the prologues of the functions to be hooked, and then resume execution of all threads.

In the whole process of suspending the threads, altering the code structure and resuming the threads there lies a possibility that the thread that was suspended was executing one of the functions that was hooked. If part of what the thread was executing was modified while it was suspended, the behavior of the thread after being resumed is unpredictable. Most modern processes will invalidate the cache and read in the modified instructions at the thread's instruction pointer, which may now be garbage.

Every thread has a context of execution at any point of time. Whenever the thread is suspended, the thread context needs to be examined. Win32 API GetThreadContext helps to get the context of the running thread.

The thread context contains processor relevant information like state of the registers including the location where EIP points to.

In accordance with one embodiment, it is verified that the EIP isn't within a region that was modified during hooking (e.g., check if the EIP lies within the prologue).

FIG. 1 is a flow diagram of a dynamic hooking process 100 in accordance with one embodiment of the present invention.

From an ENTER OPERATION 102, flow moves to a SUSPEND THREAD(S) OPERATION 104. In SUSPEND THREAD(S) OPERATION 104, any and all threads of the target process to be hooked are suspended.

From SUSPEND THREAD(S) OPERATION 104, flow moves to a GET CONTEXT(S) OF SUSPENDED THREAD(S) OPERATION 106. In GET CONTEXT(S) OF SUSPENDED THREAD(S) OPERATION 106, the context of each suspended thread is obtained, e.g., using the Win32 API GetThreadContext.

From GET CONTEXT(S) OF SUSPENDED THREAD(S) OPERATION 106, flow moves to a HOOK FUNCTION(S) OPERATION 207. In HOOK FUNCTION(S) OPERATION 107, the desired functions are hooked, for example, by overwriting the usual prologue with a jump or call instruction to the hooking code.

From HOOK FUNCTION(S) OPERATION 107, flow moves to an ARRANGE HOOKED FUNCTION(S) INTO A BINARY SEARCH TREE OPERATION 108. In ARRANGE HOOKED FUNCTION(S) INTO A BINARY SEARCH TREE OPERATION 108, each function that is hooked is arranged in a binary search tree with the following information:

```
HOOKED_FUNCTION
    DWORD HookedPrologueStart
    DWORD HookedPrologueEnd
    DWORD SavedPrologueStart
```

The binary search tree is sorted based on the HookedPrologueStart field.

From ARRANGE HOOKED FUNCTION(S) INTO A BINARY SEARCH TREE OPERATION 108, flow moves to a SELECT FIRST SUSPENDED THREAD OPERATION 110. In SELECT FIRST SUSPENDED THREAD OPERATION 110, the first suspended thread is selected.

From SELECT FIRST SUSPENDED THREAD OPERATION 110, flow moves to a GET EIP OF SUSPENDED THREAD OPERATION 112. In GET EIP OF SUSPENDED THREAD OPERATION 112, the EIP for the suspended thread, sometimes called the "ThreadEIP", is obtained, e.g., from the context of the suspended thread obtained in OPERATION 106.

From GET EIP OF SUSPENDED THREAD OPERATION 112, flow moves to a PrologueStart<=ThreadEIP<PrologueEnd CHECK OPERATION 114. In PrologueStart<=ThreadEIP<PrologueEnd CHECK OPERATION 114, a determination is made as to whether PrologueStart<=ThreadEIP<PrologueEnd for any node in the binary search tree, i.e., whether the ThreadEIP is greater than or equal to PrologueStart and less the PrologueEnd. If the ThreadEIP is less than PrologueStart or greater than or equal to PrologueEnd, the suspended thread was not executing the hooked function. Conversely, if the ThreadEIP is greater than or equal to PrologueStart and less than PrologueEnd, the suspended thread was executing the hooked function.

Accordingly, if the ThreadEIP is less than PrologueStart or greater than or equal to PrologueEnd, flow moves to RESUME THREAD OPERATION 116 and the thread is resumed. Conversely, if the ThreadEIP is greater than or equal to PrologueStart and less than PrologueEnd, flow moves to CHANGE CONTEXT OF THREAD OPERATION 118.

In CHANGE CONTEXT OF THREAD OPERATION 118, the context structure of the thread is changed, e.g., using SetThreadContext, as follows:

OffsetFromPrologueStart=ThreadContext->EIP−Node->HookedPrologueStart

ThreadContext->EIP=Node->SavedPrologueStart+OffsetFromPrologueStart.

From CHANGE CONTEXT OF THREAD OPERATION 118, flow moves to RESUME THREAD OPERATION 116 and the thread is resumed.

From RESUME THREAD OPERATION 116, flow moves to an ADDITIONAL SUSPENDED THREADS CHECK OPERATION 120. In ADDITIONAL SUSPENDED THREADS CHECK OPERATION 120, a determination is made as to other there are any additional suspended threads.

If there are no additional suspended threads, flow moves to and exits at an EXIT OPERATION 122. Conversely, if there are additional suspended threads, flow moves to a SELECT NEXT SUSPENDED THREAD OPERATION 124.

In SELECT NEXT SUSPENDED THREAD OPERATION 124, the next suspended thread is selected for operation. OPERATIONS 112, 114, 116, and sometimes OPERATION 118, are performed on the thread selected in OPERATION 124. OPERATIONS 120, 124, 112, 114, 116, and sometimes 118, are performed until a determination is made that there are no additional suspended threads in ADDITIONAL SUSPENDED THREADS CHECK OPERATION 120, and flow moves to and exits at EXIT OPERATION 122.

In the above manner, the following operations to the end of the hooking prologue are added:

1. Enumerate through the list of threads in the process
2. Get the EIP field out of the thread's context (via GetThreadContext) and search through the binary search tree for a node that has a PrologueStart<=ThreadEIP>PrologueEnd.
3. If no matching nodes are found, resume the thread and repeat operation 1
4. If a matching node was found, it effectively means the code was pulled out from under the thread. We must now change the thread's context structure (e.g., SetThreadContext) as follows:
   OffsetFromPrologueStart=ThreadContext->EIP−Node->HookedPrologueStart
   ThreadContext->EIP=Node->SavedPrologueStart+OffsetFromPrologueStart
5. Resume the thread and repeat at operation 1

Operation 4 is calculating the offset of the thread's instruction pointer into the prologue and then redirecting it to the copy of the saved prologue, which then jumps back to the original function.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:

suspending a thread;

hooking a function comprising modifying code of said function; and determining whether said thread was executing said modified code when said thread was suspended.

2. The method of claim 1 further comprising getting a context of said thread.

3. The method of claim 2 wherein said context comprises a ThreadEIP of said thread.

4. The method of claim 3 wherein said determining comprises determining whethere said ThreadEIP is greater than or equal to a PrologueStart and less than a PrologueEnd.

5. The method of claim 4 further comprising resuming said thread if said ThreadEIP is less than said PrologueStart or greater than or equal to said PrologueEnd.

6. The method of clam 4 further comprising changing a context of said thread if said ThreadEIP is greater than or equal to said PrologueStart and less than said PrologueEnd.

7. The method of claim 6 wherein said changing a context of said thread comprises:

OffsetFromPrologueStart=ThreadContext->EIP−Node->HookedPrologueStart

ThreadContext->EIP=Node->SavedPrologueStart+OffsetFromPrologueStart.

8. The method of claim 1 wherein said hooking comprises overwriting a prologue with a jump or call instruction to a hooking code.

9. A method comprising:

suspending threads of a target process;

saving a copy of a prologue of said target process;

hooking said target process comprising overwriting said prologue; and determining whether any of said threads was executing said prologue during said suspending.

10. The method of claim 9 wherein for any threads that were executing said prologue during said suspending, said method further comprising:

changing a context of said threads; and resuming said threads.

11. The method of claim 10 wherein said changing a context of said threads comprising:

calculating an offset of the thread's instruction pointer into said prologue; and redirecting the thread to said saved copy of said prologue.

12. The method of claim 9 wherein for any threads that were not executing said prologue during said suspending, said method further comprising resuming said threads.

13. The method of claim 9 wherein said prologue is overwritten with a jump or call instruction to hooking code during said hooking.

14. The method of claim 9 further comprising determining context of said threads using GetThreadContext.

15. The method of claim 9 wherein said determining whether any of said threads was executing said prologue during said suspending comprises determining whether EIP lies within the prologue.

16. The method of claim 9 wherein functions are hooked during said hooking, said method further comprising arranging said hooked functions into a binary search tree.

17. The method of claim 16 wherein each function that is hooked is arranged in said binary search tree with the following information:

HOOKED_FUNCTION

DWORD HookedPrologueStart

DWORD HookedPrologueEnd

DWORD SavedPrologueStart.

18. A method comprising:

(a) enumerating through a list of suspended threads in a process;

(b) getting an EIP field of the thread's context;

(c) search through a binary search tree for a node that has a PrologueStart<=ThreadEIP<PrologueEnd;

(d) if no matching nodes are found, resume the thread and repeat operation (a);

(e) if a matching node is found, change the thread's context structure as follows:

OffsetFromPrologueStart=ThreadContext->EIP−Node->HookedPrologueStart

ThreadContext->EIP=Node->SavedPrologueStart+OffsetFromPrologueStart; and (f) Resume the thread and repeat at operation (a).

* * * * *